April 21, 1936.                J. CAMPBELL                2,038,413
                  PISTON FOR INTERNAL COMBUSTION ENGINES
                  Filed Jan. 24, 1934          2 Sheets-Sheet 1
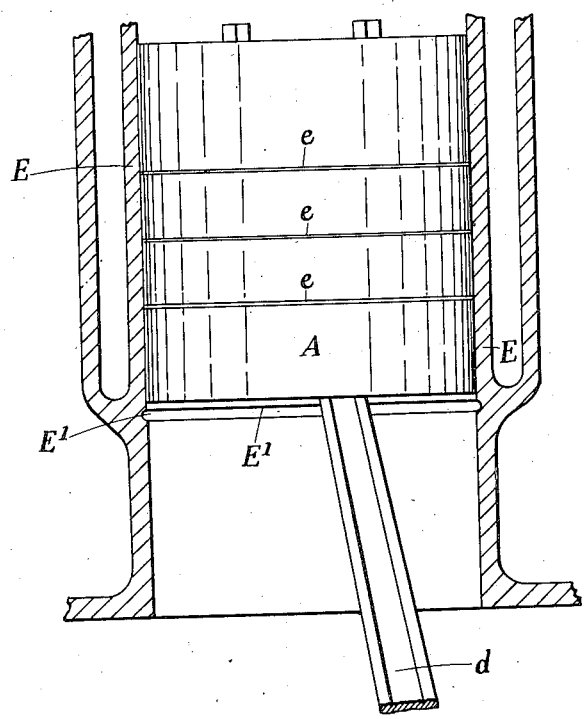
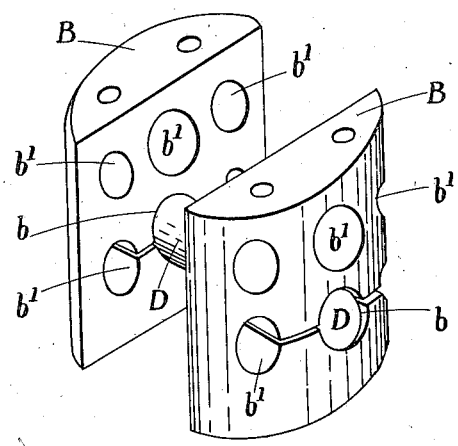
INVENTOR
James Campbell
BY
J. Ogden O'Brien
ATTORNEY April 21, 1936.  J. CAMPBELL  2,038,413
PISTON FOR INTERNAL COMBUSTION ENGINES
Filed Jan. 24, 1934  2 Sheets-Sheet 2
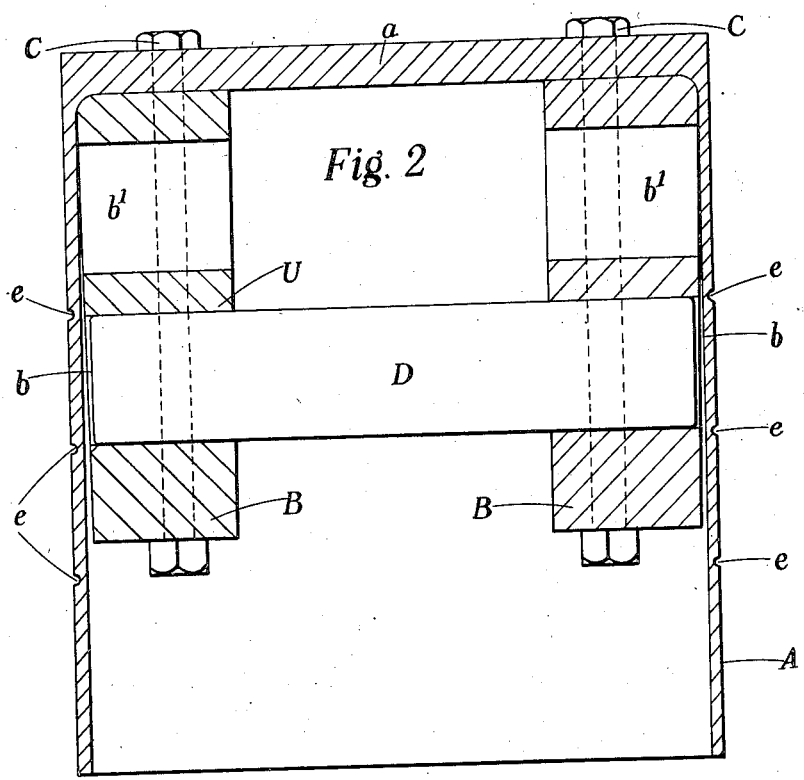
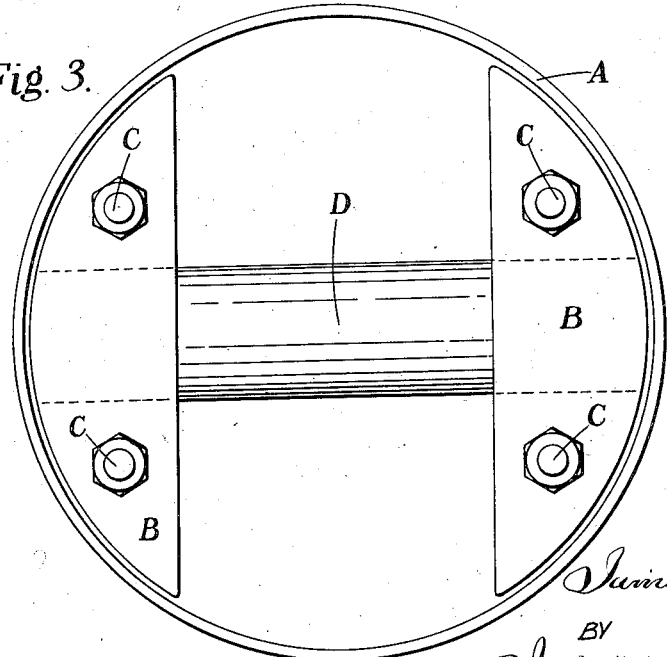

Patented Apr. 21, 1936

2,038,413

UNITED STATES PATENT OFFICE 2,038,413

PISTON FOR INTERNAL COMBUSTION ENGINES

James Campbell, Darwen, England

Application January 24, 1934, Serial No. 708,104
In Great Britain June 14, 1933

1 Claim. (Cl. 309—16)

This invention relates to pistons for internal combustion engines of the type in which the gudgeon pin of the connecting rod is mounted in bearings bolted or otherwise affixed to the head of the piston whereby the gudgeon pin does not project into or through the walls of the piston.

The piston according to the invention comprises an outer cylindrical sleeve or shell of relatively large area without any piston rings, two segmental blocks, secured to the inner surface of the piston head by bolts or screws, the peripheral surface of the segmental blocks being out of contact with the inner face of the piston sleeve and a gudgeon pin mounted in the segmental blocks.

The invention will be fully described with reference to the accompanying drawings:—

Fig. 1 is an elevation of the piston with a cylinder shown in cross-section.

Fig. 2 is a sectional elevation of the piston.

Fig. 3 is an inverted plan view of the piston.

Fig. 4 is a perspective view of blocks B.

In carrying out the invention the piston sleeve or shell A is formed of relatively large surface area to contact with the cylinder walls E, the head $a$ being cast integral therewith. Two segmental blocks B are secured to the piston head within the interior of the sleeve or shell A by set screws C inserted therein. The two segmental blocks B are secured within the sleeve A with their peripheries out of contact with the inner surface of the sleeve leaving a space between the two surfaces This prevents any distortion of the sleeve by expansion or contraction of the blocks.

The blocks B have holes $b$ for the gudgeon pin D of the connecting rod $d$ by which the small end of the connecting rod is fitted to the piston, the blocks being preferably split as shown to grip the pin D, or bushes for such pin inserted in the holes. The blocks B may have recesses or apertures $b^1$ formed therein to reduce weight.

Owing to the relatively large peripheral surface area of the piston in contact with the walls of the cylinder E it does not distort on heating and can therefore be made a closer fit in the cylinder thereby obviating the employment of piston rings.

An oil feed duct or groove $E^1$ is formed in the cylinder wall E and oil grooves $e$ are formed around the periphery of the sleeve A which will receive oil from the duct or groove E as they pass it on each stroke to lubricate the piston.

What I claim as my invention and desire to protect by Letters Patent is:—

A piston for internal combustion engines comprising an outer plain cylindrical sleeve, a plain circular piston head at one end formed integrally with the sleeve, a gudgeon pin carried by the piston head, segmental bearing blocks, partially split horizontally in which the gudgeon pin is mounted remote from the sleeve and by which it is gripped and two pairs of bolts by which the blocks are attached to the underside of the piston head.

JAMES CAMPBELL.